United States Patent [19]

Rabouyt

[11] Patent Number: 5,042,747
[45] Date of Patent: Aug. 27, 1991

[54] VERTICAL TAKE-OFF AIRCRAFT

[76] Inventor: Denis Rabouyt, 90ter, rue Pierre Brossolette, 92140 Clamart, France

[21] Appl. No.: 328,195
[22] PCT Filed: Jun. 10, 1987
[86] PCT No.: PCT/FR87/00205
  § 371 Date: Feb. 9, 1989
  § 102(e) Date: Feb. 9, 1989
[87] PCT Pub. No.: WO88/09746
  PCT Pub. Date: Dec. 15, 1988
[51] Int. Cl.[5] .......................... B64C 27/02; B64C 5/16
[52] U.S. Cl. ..................................... 244/17.19; 244/6; 244/17.21
[58] Field of Search ............... 244/17.19, 17.21, 17.11, 244/7 C, 6 R, 8, 3.24, 3.3

[56] References Cited

U.S. PATENT DOCUMENTS

| | | | |
|---|---|---|---|
| 2,424,882 | 7/1947 | Gluhareff | 244/17.21 |
| 2,481,502 | 9/1949 | Downing | 244/6 |
| 2,547,255 | 4/1951 | Bruel | 244/17.19 |
| 2,630,984 | 3/1953 | Ballauer | 244/17.19 |
| 2,630,985 | 3/1953 | Sherry | 244/17.19 |
| 2,959,373 | 11/1960 | Zuck | 244/17.21 |
| 2,979,286 | 4/1961 | Stuart | 244/17.19 |
| 3,029,048 | 4/1962 | Brooks et al. | 244/17.19 |
| 3,081,052 | 3/1963 | Michel | 244/17.19 |
| 3,332,643 | 7/1967 | Toner | 244/17.21 |
| 3,563,496 | 2/1971 | Zuck | 244/17.19 |
| 3,576,299 | 4/1971 | Hanson | 244/17.21 |
| 4,247,061 | 1/1981 | Kuczynski et al. | 244/17.19 |

FOREIGN PATENT DOCUMENTS 541965 1/1932 Fed. Rep. of Germany ... 244/17.19

Primary Examiner—David H. Brown
Attorney, Agent, or Firm—William A. Drucker

[57] ABSTRACT

An aircraft of any type supported by a rotor and having an auxiliary tail is provided with means that allows, at the moment of take-off, at least part of its tail to take an inclined position in relation to the position of flight. The invention is particularly applicable to autogyros.

4 Claims, 3 Drawing Sheets

VERTICAL TAKE-OFF AIRCRAFT

The present invention relates to aircraft supported by a rotor and a fixed auxiliary tail unit, particularly for autogyros.

Despite its advantages over the helicopter in so far as the simplicity of manufacture the cost price and operating safety are concerned, the autogyro has the drawback of requiring a take-off strip, however short it may be, whereas the helicopter takes off vertically.

To overcome this drawback, it has been proposed to use the rotor of the autogyro as a vertical tractive propeller. For this, the rotor is coupled to a motor which may be the same as that of the pusher propeller and, with the pitch of the blades practically zero, launched at high speed. When the rotor has reached the desired speed, the blades are switched to the coarse pitch, which causes take-off of the autogyro.

Unfortunately, at the time of take-off, the autogyro takes a nose-up position involving the equilibrium of the aircraft which may even go as far as overturning. Practically any "jump" of the autogyro during take-off is dangerous beyond five meters and, under these conditions, such a take-off cannot be considered as a true vertical take-off since it can only be practiced with an immediate suitable environment.

The object of the present invention is precisely to permit true vertical take-off so well beyond five meters, for autogyros whose support is provided by a rotor and an auxiliary tail unit fixed in flight.

According to the invention, the aircraft is provided with means making it possible for at least a part of its tail unit to take up an inclined position with respect to the normal flight position.

In an advantageous embodiment of the invention, the part of the tail unit which may be inclined with respect to its normal flight position is mounted on a shaft which is substantially parallel to the plane of rotation of the rotor of the aircraft.

In one variant, the aircraft is provided with means for "disengaging" the part of the tail unit mounted on the shaft, so as to allow it to rotate freely about this shaft.

The means for implementing the invention may advantageously be formed of a linkage with bell-crank levers, one at least of which is provided with a device for locking the tail unit in the flight position.

These means may even provide automatic locking of the tail unit provided by the latter when it reaches its normal flight position.

Other features and advantages of the invention will be clear from the following description, with reference to the accompanying drawings illustrating one embodiment of the invention given by way of non limitative example.

Figure 1:
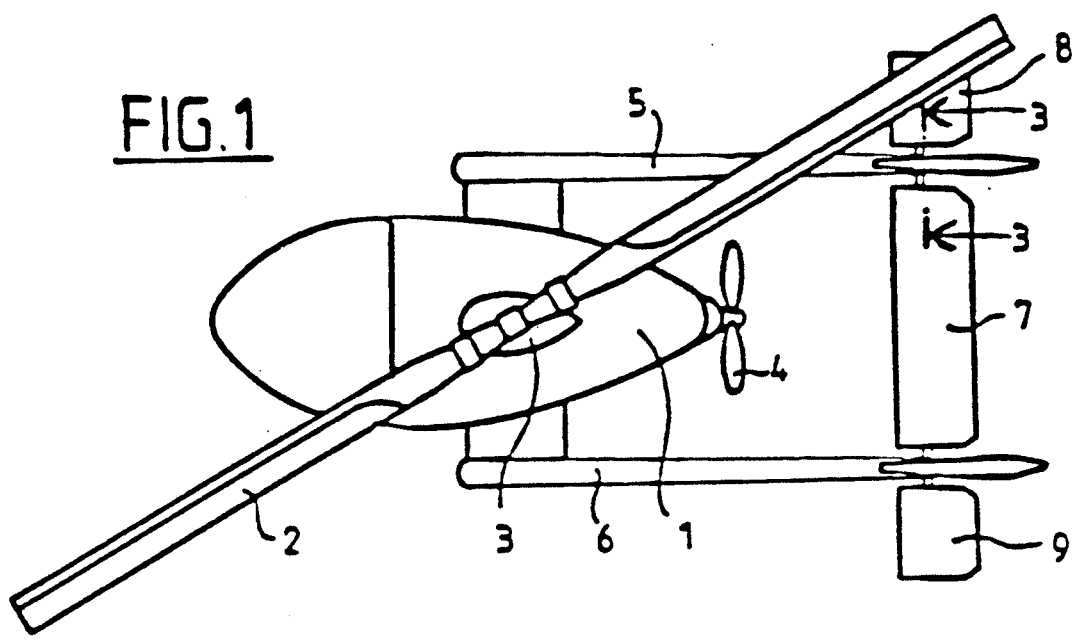
FIG. 1 shows a top view of an autogyro.
Figure 2:
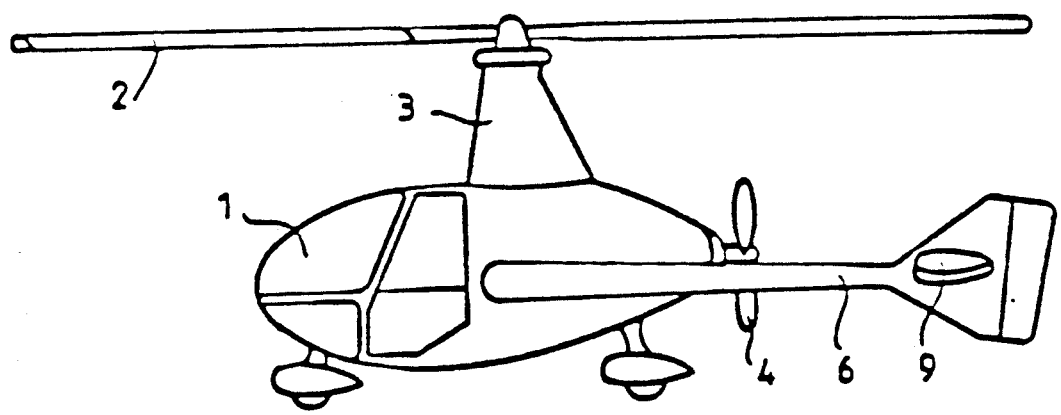
FIG. 2 shows an elevational view of FIG. 1.
Figure 3:
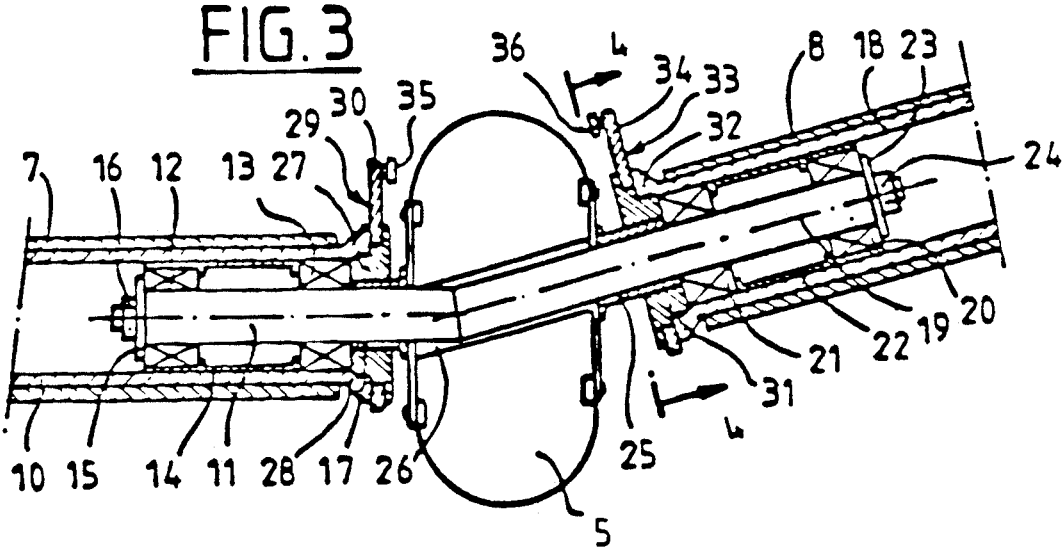
FIG. 3 is a partial section on a large scale along arrows III—III of FIG. 1.
Figure 4:
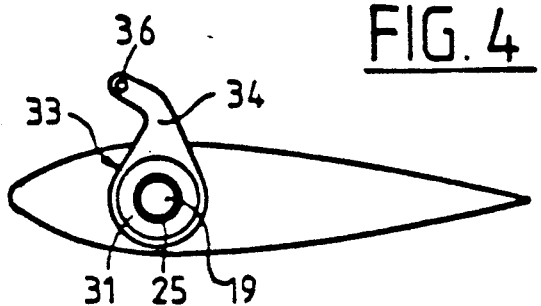
FIG. 4 is a view along arrows IV—IV of FIG. 3 but on a reduced scale.

In FIGS. 1 and 2, the autogyro comprises a body 1 supporting a pusher propeller 4, a rotor 2 mounted on a support 3, and two beams 5 and 6 themselves supporting a tail unit in three parts : an inner part 7 and two outer parts 8 and 9. The fixing of this tail unit on the beam is illustrated in FIGS. 3 and 4.

The inner part 7 comprises over the whole of its width a tubular longitudinal member 10 which is supported at each of its ends, by a spindle 11 on which two bearings 12 and 13 are mounted spaced apart by a sleeve 14. These bearings and the spacer sleeve are held on spindle 11, on the one hand by a washer 15 held by a nut 16 screwed on the threaded end of the spindle and, on the other hand, by a ring 17 welded to the spindle 11 and screwed on beam 5. The longitudinal member 10 ends in an end piece 28, in which is screwed a threaded plug 27. A piece 29, sandwiched between end piece 28 and plug 27 carries a lever 30 equipped with a crank pin 36.

Fixing of the outer part 8 of the tail unit is identical and comprises a tubular longitudinal member 18 carried by a spindle 19 by means of two bearings 20 and 21, spaced apart by a sleeve 22, the bearings being held in place by a washer 23 and a nut 24 and by a ring welded on spindle 19 and screwded on beam 5, the assembly being closed by a threaded plug 31 which maintains against the end piece 32 a piece 33 identical to piece 29 with a lever 34 carrying a crank pin 36.

Spindle 19, whose axis is slanted slightly with respect to the axis of spindle 11, is welded thereto, the assembly of the two spindles passing through beam 5 through a passage 26 provided for this purpose. The fixing of the outer part 9 is symmetrical with the fixing of 8 and comprises particularly a piece 33 with a lever 34 carrying a crank pin 36.

Each part 7, 8 or 9 of the tail unit is thus mounted for rotation with respect to beams 5 and 6 and so with respect to the body of the autogyro and its axis of rotation has been chosen not only in front of its centre of gravity, but also in front of its thrust centre.

The device for operating these parts 7, 8 and 9 comprises a locking system, a transmission system and a control system.

The control system comprises a rigid control rod 94 articulated to a lever 74. The lever is itself articulated at 75 to a point which is fixed with respect to the autogyro and has a handle 76. The end of the control rod participates also in the locking system which comprises a bell-crank lever 37 in the form of a disc, mounted for rotation about a shaft 77 fixed with respect to the autogyro. This bell-crank lever comprises a notch 40, a crank pin 41 and two diametrically opposed arms 38 and 39 each of which has a perforation, respectively 95 and 96. A friction disc 46 is mounted on shaft 77 against the bell-crank lever 37.

Rigid rod 42 sliding in a sliding bearing 43 has a protuberance 44 and ends in a circular heel 45. The control rod 94 sliding in bearing 47 has, at its end, a finger 50, at right angles to rod 94 and comprising a substantially semi-circular notch 51 and a chamber 48 receiving a spring 49 which bears on one end of chamber 48 and on the circular heel 45 of rod 42.

Figure 7:
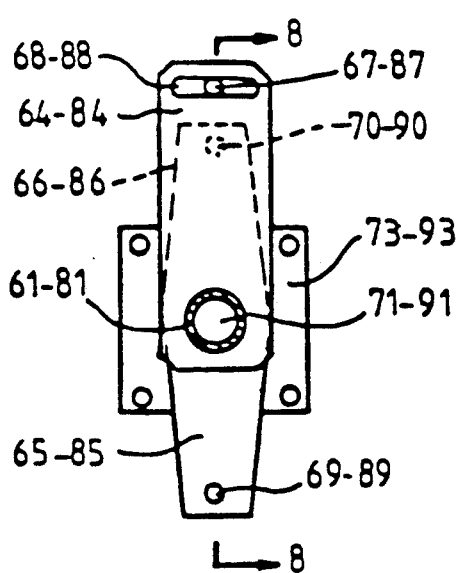
FIGS. 7 and 8 show on a larger scale another detail of FIG. 5, FIG. 7 being a section through VII—VII of FIG. 8 and FIG. 8 a section through VIII—VIII of FIG. 7.
Figure 8:
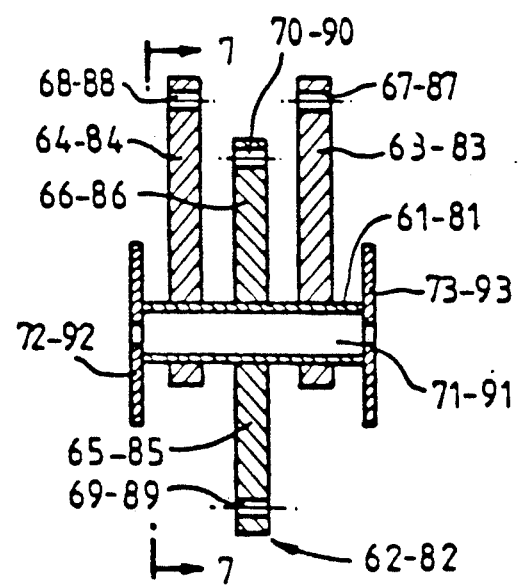

The transmission system housed partially in the body of the autogyro and partially in the two beams 5 and 6 comprises two bell-crank levers 60 and 80, illustrated in FIGS. 7 and 8, the four cables 52, 53, 54 and 55 and four links 56, 57, 58 and 59.

The bell-crank levers 60 and 80 are identical and are disposed in housings provided for this purpose in beams 5 and 6 and are provided with an inspection trap for access.

The bell-crank lever 60 is formed of a tube 61 with four levers 63, 64, 65 and 66 and rotates on a fixed shaft 71.

Bell-crank lever 80 is formed of a tube 81 with four levers 83, 84, 85 and 86 and rotates on a fixed shaft 91.

Levers 65 and 66 form one and the same piece 62 and have two circular perforations 69 and 70 situated at equal distances from the pivoting axis of the bell-crank lever 60.

Levers 85 and 86 also form one and the same piece 82 and also have two circular perforations 89 and 90 situated at equal distances from the pivot axis of bell-crank lever 80.

Levers 63 and 64 are perforated, beyond lever 66, at equal distances from the pivot axis of bell-crank lever 60. But the perforation 67 of lever 63 is circular whereas the perforation 68 of lever 64 is in the form of an oblong aperture.

Similarly, the levers 83 and 84 comprise, the first one a circular perforation 87 and the second an oblong aperture 88.

Finally, shafts 71 and 91, on which the bell-crank levers 60 and 80 are journalled, are held respectively by plates 72-73 and 92-93 fixed on each side of beams 5 and 6.

Figure 5:
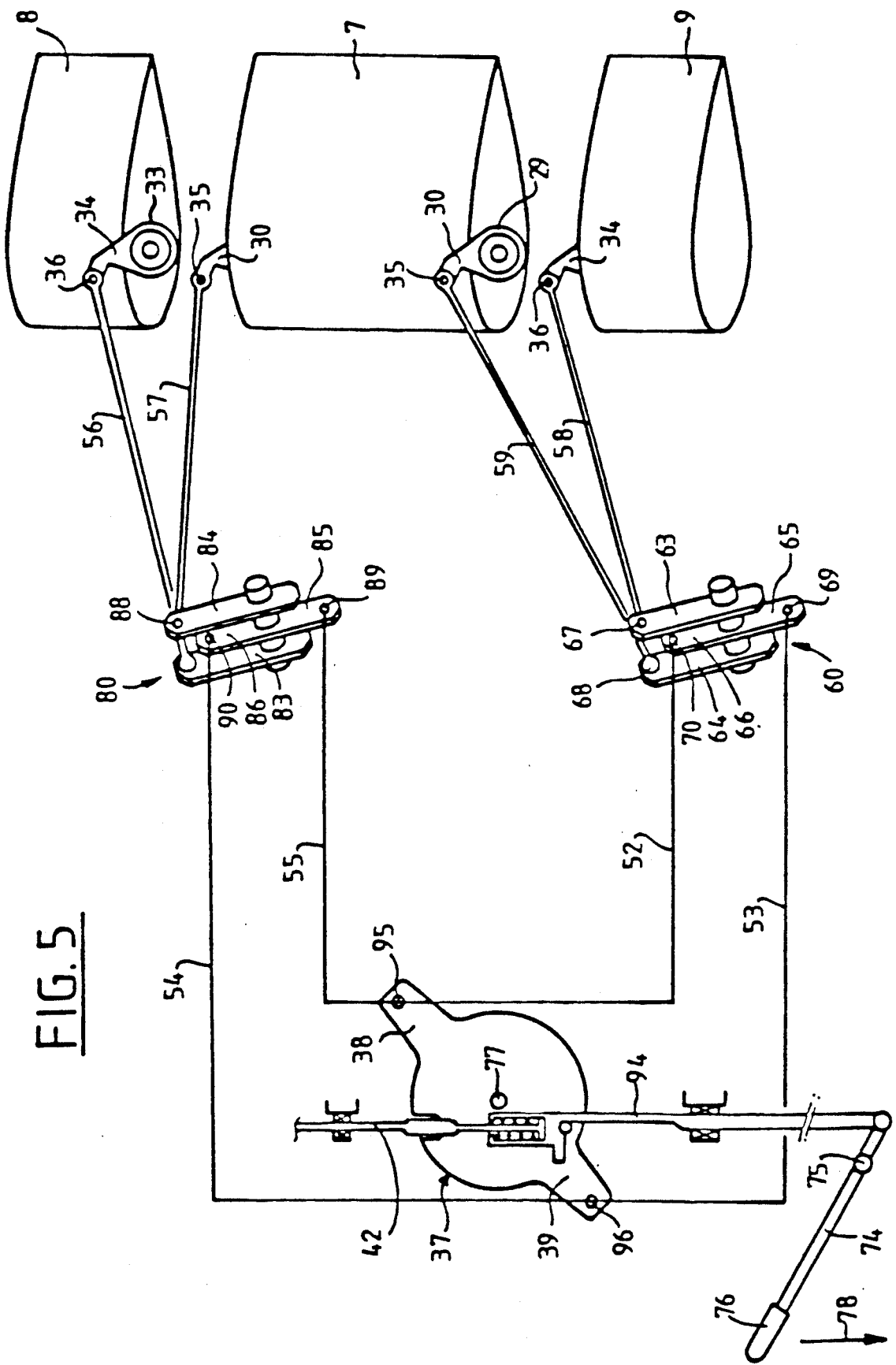
FIG. 5 shows schematically the assembly for controlling the tail unit.

The linkage is illustrated schematically in FIG. 5.

The sheathed cables 52 and 55 are attached at one of their ends to the perforation 95 of arm 38 of the bell-crank lever 37, cable 52 being attached at its other end to the perforation 70 of the lever 66 of bell-crank lever 60, whereas cable 55 is attached at its other end to the perforation 89 of lever 85 of the bell-crank lever 80.

Cables 53 and 54 are attached to the perforation 96 of arm 39 of the bell-crank lever 37, cable 53 being attached at its other end to the perforation 69 of the lever 65 of bell-crank lever 60, whereas cable 54 is attached at its other end to the perforation 90 of lever 86 of the bell-crank lever 80.

Link 56 has at one end a crank pin engaged in perforation 87 of lever 83 of bell-crank lever 80 and, at its other end, a perforation in which is engaged the crank pin 36 of lever 34 of piece 33 carried by the outer part 8 of the tail unit.

Link 58 has at one end a crank pin engaged in the perforation 67 of lever 63 of bell-crank lever 60 and, at its other end, a perforation in which is engaged the crank pin 36 of lever 34 of piece 33 carried by the outer part 9 of the tail unit.

Link 57 has at one end a crank pin engaged in the aperture 88 of lever 84 of bell-crank lever 80 and, at its other end, a perforation in which is engaged the crank pin 35 of lever 30 of piece 29 carried by the inner part of the tail unit on its outer part side 8.

Link 59 has at one end a crank pin engaged in the aperture 68 of lever 64 of the bell-crank lever 60 and, at its other end, a perforation in which is engaged the crank pin 35 of lever 30 of piece 29 carried by the inner part of the tail unit on the outer part 9 side.

Links 56 and 58 extend slantwise, on the outer side of beams 5 and 6, the first in the direction of the crank pin 36 of the outer part 8 of the tail unit and the second in the direction of crank pin 36 of 9. Links 59 and 57 extend slantwise, on the inner side of the beams, in the direction of crank pins 35 of the inner part 7 of the tail unit.

Under these conditions, the operation is as described hereafter.

With the autogyro stopped, the control lever 74 is locked in the position shown in FIG. 5, i.e. the control rod 94 is in a position locking the bell-crank lever 37.

On the one hand, notch 51 of finger 50 locks the crank pin 41 and, on the other hand, the protuberance 44 of rod 42 is engaged in notch 40 under the action of spring 49 urging the heel 45 of said rod against the bottom of chamber 48.

The purpose of the friction disc 46 is to damp the vibrations which may be at the level of the tail unit, e.g. because of turbulences. By increasing to a greater or lesser degree the pressure of this disc on the bell-crank lever 37, the damping of these vibrations may be increased to a greater or lesser extent.

With this arrangement, cable 52 holds the upper part of bell-crank lever 60 slanted forwards, and cable 54 holds the upper part of bell-crank lever 80 slanted forwards, the lower parts of these bell-crank levers being pushed rearwards to a greater or lesser extent by cables 53 and 55.

With these actions, the lever 83 of bell-crank lever 80 holds the outer part 8 of the tail unit in the flight position, by means of link 56, and lever 63 of bell-crank lever 60 maintains the outer part 9 of the tail unit in the flight position through link 58.

At the same time, levers 84 and 64 hold the inner side 7 of the tail unit in the flight position through links 57 and 59.

On start up, the pilot conventionally couples the rotor 1 to its control motor, the blades of the rotor being at zero pitch. Concurrently, or simultaneously, the motor of the pusher propeller has been started.

When the rotor has reached a sufficient speed of rotation to provide take-off of the autogyro, the pilot simultaneously places the rotor to the coarse pitch and operates the control lever 74 in the direction of arrow 78.

Such operation of lever 74 results in pushing the control rod 94 back, thus freeing the notch 51 of finger 50 from the crank pin 41, and disengaging the protuberance 44 of rod 42 from notch 40.

Thus, cables 52, 53, 54 and 55 are unlocked, as well as links 56, 57, 58 and 59 and, under these conditions, the three parts 7, 8 and 9 of the tail unit are no longer held in the position shown in FIGS. 1, 2 and 5 and may therefore rotate respectively about the spindles 11 and 19.

First of all, because their centre of gravity is situated behind the shafts on which they rotate, the three parts of the tail unit will tend to be placed vertically and not horizontally.

In addition, the two outer parts 8 and 9 of the tail unit receive a substantially vertical air flow from the blades of the rotor rotating at high speed, since it is a question of a take-off speed and this flow will be all the higher since it is situated practically at the end of the blades. Considering the fact that their thrust centres are also behind the axes of the spindles on which they are mounted, the two outer parts 8 and 9 will tend to assume the same vertical position as under simple gravity.

On the other hand, the inner part 7 of the tail unit receives both a vertical air flow from the rotor and a horizontal air flow from the pusher propeller its position will be more or less slanted, depending on the characteristics of the two flows which it receives.

Under these conditions, and due to its profile necessarily aerodynamic since it is a question of a support member, the tail unit, during vertical take-off of the autogyro only opposes a low resistance to the air flow from the rotor and therefore does not risk causing the autogyro to take a nose-up position.

When the autogyro takes off, the pilot disengages the rotor 1 which then turns freely and only sends a decreasing flow over the tail unit, whereas the horizontal flow from the pusher propeller towards the inner part of the tail unit remains constant. Because links 57 and 59 have their crank pin engaged in oblong apertures 68 and 88, the inner part 7 of the tail unit may assume an intermediate position between the position at the time of take-off and the flight position, which intermediate position may further vary since it will be exactly the resultant of the two flows received.

At the same time as he disengages the rotor 1, the pilot operates lever 74 in the direction opposite arrow 78. In this movement, the control rod 94 tends to cause the bell-crank lever 37 to pivot towards the position shown in FIG. 5.

Moreover, the rotor rotates at a lower and lower speed well removed from its speed of rotation on take-off and, when it reaches its cruising speed, the air no longer passes through the rotor from top to bottom but from bottom to top. The action of the rotor on the tail unit has then gradually decreased until it ceases completely and thus leaves the place to that of propeller 4 and that of the relative wind.

Figure 6:
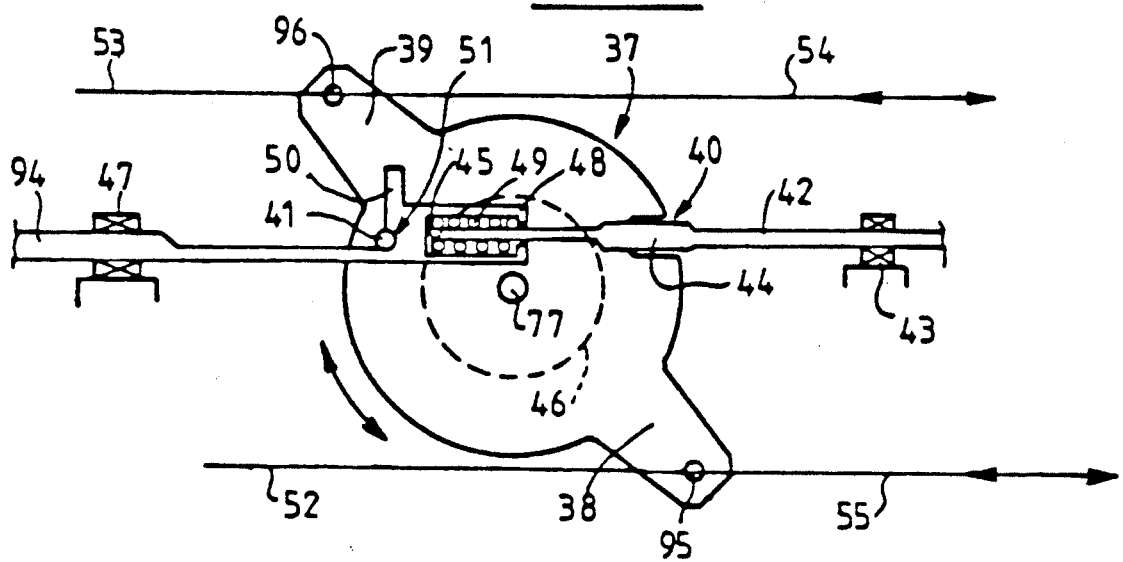
FIG. 6 shows on a larger scale a detail of FIG. 5.

The tail unit has then taken up its flight position causing the bell-crank levers 80 and 60 to pivot by means of links 56, 57, 58 and 59; bell-crank lever 37 itself takes up its position shown in FIGS. 5 and 6 and, in this position, under the action of spring 49, the protuberance 44 is engaged in notch 41 thus locking the angular position of the bell-crank lever 37. Thus, all the tail unit 7, 8 and 9 is locked in the flight position.

Of course, without departing from the scope of the invention, such or such a detail may be modified or such another construction adopted, so as to obtain the same results.

I claim:

1. An autogyro, comprising:
(a) a rotor having a plane of rotation,
(b) a propeller
(c) a tail unit having at least one inner plane part located in the well of wind of the rotor and the propeller, said inner part having a transverse axis of pivoting which is substantially parallel to said plane of rotation and being mounted for freely pivoting about said axis,
(d) locking means for locking said inner part in a normal flight position and unlocking means for releasing said inner part to allow it to pivot freely and take a downwardly inclined position with respect to the normal flight position at the time of take-off,
(e) said locking and unlocking means comprising a linkage, comprising bell-crank levers having a friction device.

2. An autogyro, comprising:
(a) a rotor having a plane of rotation,
(b) a propeller
(c) a tail unit having at least one inner plane part located in the well of wind of the rotor and the propeller, said inner part having a transverse axis of pivoting which is substantially parallel to said plane of rotation and being mounted for freely pivoting about said axis,
(d) locking means for locking said inner part in a normal flight position and unlocking means for releasing said inner part to allow it to pivot freely and take a downwardly inclined position with respect to the normal flight position at the time of take-off,
(e) said locking and unlocking means comprising a linkage, comprising bell-crank levers having a friction device.
(f) the tail unit further having first and second outer parts, each comprising a crank pin operated by a link articulated to a bell-crank lever which forms part of said linkage, the movements of the bell-crank levers of the first and second outer parts being synchronized by said linkage.

3. An autogyro as claimed in claim 2, wherein said inner part comprises two crank pins operated by two links articulated to the bell-crank levers, carrying the links which operate the outer parts.

4. An autogyro as claimed in claim 3, wherein said two links which operate the inner part are articulated in oblong apertures.

* * * * *